March 12, 1968    R. B. MESROBIAN ET AL    3,373,224
COMPOSITIONS CONTAINING POLYAMIDES, POLYOLEFINS AND
ETHYLENE-ALPHA, BETA UNSATURATED ACID COPOLYMERS
NEUTRALIZED WITH SODIUM IONS
Filed June 19, 1967
FIG.1
FIG.3
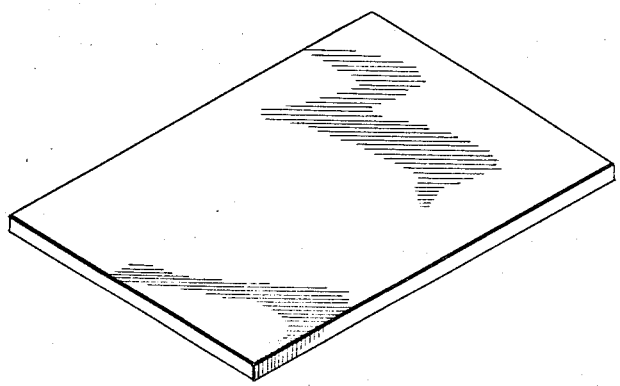
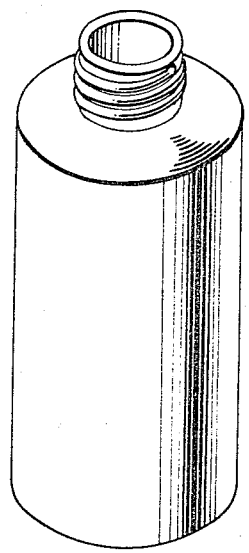
FIG.2
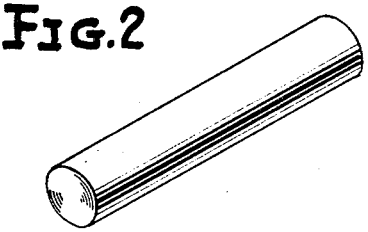
FIG.4
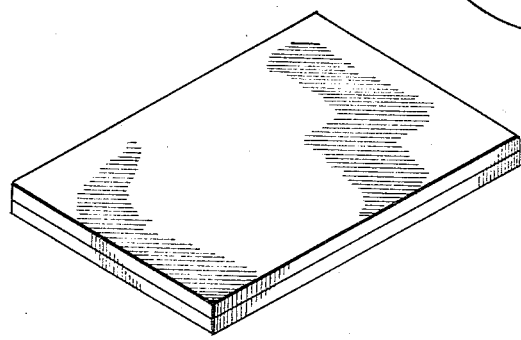
FIG.5
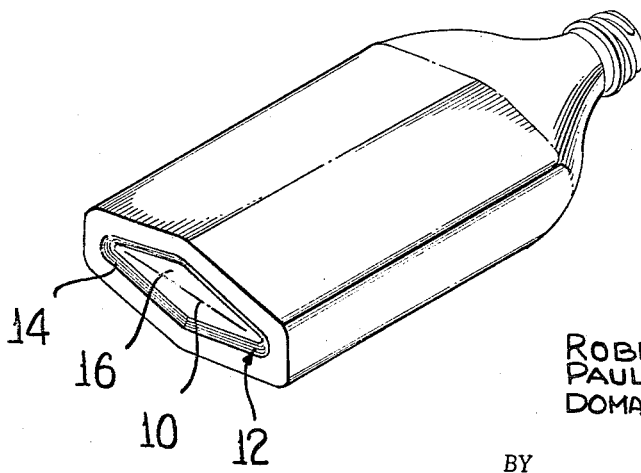
INVENTORS
ROBERT B. MESROBIAN,
PAUL E. SELLERS and
DOMAS ADOMAITIS
BY
Mason, Porter, Diller & Stewart
ATTORNEYS United States Patent Office 3,373,224
Patented Mar. 12, 1968

3,373,224
COMPOSITIONS CONTAINING POLYAMIDES, POLYOLEFINS AND ETHYLENE-ALPHA, BETA UNSATURATED ACID COPOLYMERS NEUTRALIZED WITH SODIUM IONS
Robert B. Mesrobian, Hinsdale, Paul E. Sellers, Oak Forest, and Domas Adomaitis, Chicago, Ill., assignors to Continental Can Company, Inc., New York, N.Y., a corporation of New York
Continuation-in-part of application Ser. No. 376,945, June 22, 1964. This application June 19, 1967, Ser. No. 652,990
8 Claims. (Cl. 260—857)

ABSTRACT OF THE DISCLOSURE

A composition having improved resistance to the permeation of fluids is comprised of a homogeneous mixture of a polyolefin resin, a water insoluble polyamide resin, and a metal ion-containing resin composed of a copolymer containing at least 50 mole percent ethylene based on the copolymer and an $\alpha,\beta$-ethylenically unsaturated monocarboxylic acid, the acid monomer content of the copolymer being from 0.2 to 25 mole percent based on the copolymer, the copolymer having at least 10 percent of the carboxylic acid groups thereof neutralized by sodium ions.

---

The present invention is a continuation-in-part of copending application for U.S. Letters Patent Ser. No. 376,945, filed June 22, 1964 now abandoned.

The invention relates to kneaded polymer blends formed from a hydrocarbon polymer, a water-insoluble polyamide resin, and a compatibilizing metal ion-containing polymer. More specifically, the three above components are kneaded together under an elevated temperature during which processing the first two normally incompatible components are rendered compatible one to another whereby a uniform and homogeneous polymer blend is made. The polymer blend is particularly useful for the manufacture of filaments, films, sheets, laminates and molded objects such as containers.

Many synthetic organic materials have been used for the production of films, fibers, sheets, laminates, containers and packaging materials for foodstuffs, medicinal and cosmetic preparations, deodorants, hair preparations, industrial supplies, oils, and the like. More recently, liquid bleaches and detergent materials have been packaged in extruded and blow-molded bottles in sizes ranging from a few ounces to gallon sizes.

A generally employed polymer for such uses has been polyethylene due to its relative inertness, structural strength and flexibility even at low temperatures, and its low moisture permeability. Polyethylene is easily fabricated on commercial quantity basis at reasonable cost. A limitation in the employment of polyolefins generally is that such resins are highly permeable to many organic liquids, including a large number of the organic solvents which are conventionally used in the formulation of compositions of some of the above products. The presence of these organic substances then prohibit the containment of such materials in the polyolefin resins.

Representative chemicals, for example, which permeate through polyolefins with various degrees of rapidity at room temperature, include the straight chain hydrocarbons, the aromatic hydrocarbons, esters, ketones and other similar materials; so that the use of polyethylene and other low cost and easily processible hydrocarbon resins has been restricted to those products to which the resin is substantially impermeable. A further undesirability has been identified for the use of polyethylene for bleach bottles. The bleach has a slow action upon the polyethylene which causes the same to become brittle upon standing for extended periods of time and, therefore, to become particularly susceptible to damage in handling, particularly by dropping accidentally upon hard surfaces.

In order to decrease the permeability of such polyolefin materials, it has been proposed to coat the finished product with a polymeric material which is impermeable to the aqueous based product which is to be contained, notwithstanding the added cost and time of treatment. Coating materials for this purpose have included polyvinyl chloride and polymers from other monomers, polyamides and epoxide resins. The coatings are usually applied to the side of the film, bottle or container which is next to the product being packaged, which involves pre-treating the inside of the bottle or container by flaming, electrical discharge, ionization radiation, chlorinization, chemical oxidation, etc., to attain an adequate adhesion to the polyethylene surface. Then the protective coating is applied by spraying or slush coating with a solution or premix of the selected material. The coated article is then heated for a time in order to provide curing of the material by chemical reaction or removal of the solvents. A limitation in the utility of such laminated products is that polyolefin base material and the after coated protective material are usually incompatible which causes serious delamination at the interface over extended periods.

Another limitation to the employment of such polyolefin materials is that the surface printability is poor and conventionally employed decorative lacquer systems can only be used after the surface to be printed on has been pretreated, such as above, to assure adhesion of the ink or decorative matter.

The polyamide materials, such as various nylons, have also been employed as packaging materials for various organic materials due to their good resistance to permeation by oragnic solvent liquids. Also, the surface of the polyamide resins can usually be printed upon and decorated without a pretreatment.

The nylon materials presently available are limited in molecular weight due to competing side reactions, such as cyclization product formation and, hence, molecular weights greater than about 20,000 present difficulties. By way of contrast, polyethylenes of molecular weights greatly in excess of 20,000 are readily preparable in either low or high densities. The nylon materials show good permeability resistance or the organic liquids, mentioned above, but are extremely permeable to the lower alcohols, water, and other aqueous based materials and usually exhibit dimensional instability in moist atmospheres. Nylon 6 has a melting or softening point of approximately 430° F. and can only be extruded within a narrow range of temperature above its melting point, noting that this range is very narrow and close temperature control is necessary for obtaining proper viscosity for regularizing extrusions. A characteristic of the nylon polymer is that the polymer must be completely dry before molding or extrusion in order to avoid the rapid oxidation which occurs when molding or extruding with resultant discoloration and decrease in the otherwise favorable physical properties. As nylon is very much more expensive than the polyolefin materials, in the present market, its use is generally confined to rather expensive and special fields. By the present invention, nylon materials are now employable on a commercial basis in commonly used and disposable packaging materials.

Another characteristic of nylon polymer is that its degree of crystallinity at room temperature is greatly dependent upon such factors as the degree of orientation occurring during extrusion, the amount of stretching which it has undergone, and the rate of cooling from the melted extrusion state and the annealing conditions which have been performed upon the extrudate. By comparison, polyethylenes on cooling from the melt temperature to room temperature, generally crystallize to an extent mainly dependent upon their chemical structure, rather than the orientation or annealing conditions. That is, further crystallization cannot be readily attained by mere stretching or necking-down. However, despite these incompatible characteristics, the nylon and the polyethylene have been rendered completely compatible from a commercial point of view.

Polyethylene and the polyamides are regarded as incompatible due to their difference in structure, crystallinity and chemical component groups. There are also differences in the rheological properties which prohibit the coextrusion of these two polymers simultaneously at pressures in the range of 200 to 250 pounds per square inch. As mentioned above, laminated packaging materials constructed of these two incompatible resins have not been successful due to the occurrence of delamination and the inability to secure the two layers of the laminate together. A factor which bears upon such delamination is that the polyamides, or nylons, are subject to great degradation by mechanical deformation and thus pinch-craze upon mechanical deformation whereas pure polyethylene materials have a rather quick deformation recovery and do not pinch-craze.

It has been previously suggested to knead these two materials together at high pressures and under heated conditions to attain a resin blend which has the impermeability to both organic and aqueous based materials and may be used for a fluid impermeable packaging material. Patent No. 3,093,255 to Robert B. Mesrobian and Clayton J. Ammondson describes the process for rendering these two normally incompatible materials into a polymer blend which has the noted characteristic. The material described in this patent has been used for many commercial applications including the extruding and molding of bottles for containing a variety of liquid products. In the extrusion of such material into films and employment of the same in like form or in a paper laminated form, some loss of the quick deformation recovery of polyethylene has been observed. Further, the impact strength of blown bottles from such material, while being acceptable for many commercial applications, is not considered sufficient when compared to the polyolefin packaging materials.

Another proposal has been to incorporate a small quantity of a chemically inert but physically active inorganic powder into the kneaded resin blend during the kneading operation to improve the impact resistance and the other morphological properties, such as the internal cohesion, abrasion-resistance and non-sectility properties. While this approach to the improvement of the kneaded resin blend greatly alters some of the morphological properties, it does not sufficiently alter the low resistance to pinch-crazing and, hence, does not have the quick deformation recovery of the widely employed polyolefins. The use of the powder also tends to lower the impermeability to organic fluids.

The above limitations with respect to extruding and blow-molding of fluid impermeable material may be overcome and the physical or morphological properties may be vastly improved, according to the present invention, by kneading together three separate polymers at an elevated temperature. The first polymer is a polyolefin which is present in the kneaded mixture in an amount of from 40 to 90 parts by weight. The second component is a water-insoluble polyamide resin having recurring amide groups as integral parts of the polymer chain in the amount of from 5 to 50 parts by weight. The third component is a metal ion-containing resin which is characterized by a major portion of a polyolefin-type backbone structure with distributed chain groups which have pendent carboxylic groups which furnish side branching from the main polymer chain and which are, in turn, partially neutralized by sodium ions. The last component is present in the kneaded mixture in an amount of from 2 to 25 parts by weight. With polymer pellets of the three components mixed and then extruded through a normal commercial extruder operated at elevated temperatures and kneading pressures attained by the placement of a gating valve therein, the polymer material may be produced at approximately the same rate as presently employed for purely polyolefin resins. The polymer may be extruded in a number of useful forms such as filaments, fibers, films and tubular sections and parisons for use in blow-molding containers. Such articles have very high permeation resistance to both organic materials and aqueous base materials and are useful for holding such commercial products as liquid detergent and bleaches. The material when used for making blow-molded bottles does not pinch-craze or crack when stacked in shipping containers and does not become brittle upon standing with a commercial bleach content.

The impact strength of articles having extended surfaces is greater than the above-mentioned fluid impermeable materials and shows good internal cohesion even when heated to as high as 235° C. while at the same time is highly abrasion resistant and does not pinch-craze and delaminate upon deformation by mechanical force at angles of 180 degrees. Therewith, the material shows immediate deformation recovery after the imposed mechanical force is removed. The rheological properties are such that the material of the present invention may be extruded and blow-molded with approximately the ease and reproducibility as with the use of polyolefin resins.

In addition to the above-noted properties of the material of the present invention, the kneaded polymer blend is also compatible with pigment, dyes, and other coloring matter, such as ultramarine blue and titanium dioxide, with no alteration in the resistance to pinch-crazing and the other favorable morphological properties. The surface of formed articles of the material is also printable with conventional inks employed for printing upon treated plastic surfaces, but without a prior surface treatment.

The material is particularly useful on a commercial basis due to the fact that thin panels of the material may be molded for the side walls and end walls of container bodies to provide improved appearances and economies. The material, even when molded in such thin panels, does not pinch-craze upon the stacking of molded bottles in packaging cases, dropping upon hard surfaces or occurrence of rough handling. The material is, unexpectedly, able to form intricate and indented bottom-seam configurations on blow-molded containers which are strongly resistant to breakage upon drops from 5 to 6 feet, which is a practical and commercial basis test for household product containers.

Due to the presence of the metal ion-containing polymer, desirable properties of the composition are obtainable at very low concentrations of the polyamide component. The ability to form a resin system having all of the above properties with a lesser proportion of the expensive polyamide presents very desirable economics, which, in turn, allow commercialization on a large volume basis. By contrast, the prior fluid impermeable resin systems have required large concentrations of this polyamide component.

It is, therefore, an object of the present invention to provide a process of preparing a polymer resin composition which is resistant to permeation of fluids and which is moldable into non-pinch-crazing forms and possesses the above-noted characteristics by first kneading together a mixture comprising 40 to 90 parts by weight of a molten polyolefin resin, a water-insoluble polyamide resin having recurring amide groups as integral parts of the polymer chain in an amount of from 5 to 50 parts by weight, and 2 to 25 parts by weight of a metal ion-containing resin consisting of a copolymer containing at least 50 mole percent ethylene based on the copolymer, and an α,β-ethylenically unsaturated monocarboxylic acid, the acid monomer content of said copolymer being from 0.2 to 25 mole percent based on the copolymer, said copolymer having at least 10 percent of the carboxylic acid groups thereof neutralized by sodium ions. After the kneading at an elevated temperature, the mass is lowered to ambient conditions. The material produced can then be used for extrusion in normal laboratory and commercial equipment to form filaments, fibers, films and blow-molded objects.

In the drawings:

FIGURE 1 shows a perspective view of a film of the pressure kneaded polymer blend of the present invention.

FIGURE 2 shows a perspective view of a fiber or a filament extruded from the pressure kneaded polymer blend of the present invention.

FIGURE 3 shows a perspective view of a blow molded container made from the material of the present invention.

FIGURE 4 shows a perspective view of the end of a blown bottle made from the material of the present invention in which the bottom seam has an indented configuration.

FIGURE 5 shows a perspective view of the end of a blown bottle made from the material of the present invention in which the bottom seam has an indented configuration.

The articles shown in FIGURES 1–5 may be formed by appropriate extruding and/or blow molding operations from the novel material of the present invention. The film of FIGURE 1 may be extruded through a thin-lipped die and then cooled down to room temperature as with the manufacture of polyethylene sheeting. The film is smooth surfaced and of a homogeneous surface characteristic under microscopic examination.

The fiber shown in FIGURE 2 may be extruded at a constant diameter for very long lengths and retains its homogeneous character at denier sizes produced by extruded polymers, such as polyvinylidene chloride. The fibers and filaments are distinguished by immediate deformation recovery after an applied mechanical strain is removed. There is no delamination or separating of the various portions of the fibers and filaments upon repeated bending and twisting.

The container of FIGURE 3 is a blow-molded bottle which was extruded in the form of a tube of a thickness greater than the thickness of the sidewalls of the bottles and then blown by an inert gas so as to conform to a mold form. Bottoms seams which are pinched off during the manufacture of the blown bottle can be formed repeatedly with reproducibly good results. The bottles once manufactured show very high impact strength when filled with liquid contents and dropped upon a hard surface from heights of from 6 or more feet. In many blown containers, the bottom pinch seam is the first portion which cracks or breaks, thereby releasing the liquid contents of the bottle. The bottom seam of the bottles manufactured from the novel material of the present invention does not break or open upon dropping to an extent appreciable from a commercial standpoint. The blown bottle is representative of tubes, cups and other containers which may also be made by similar techniques.

The laminate of FIGURE 4 may be commercially manufactured by extruding a thin section of the novel material and, while at an elevated temperature, pressing the same into the surface of a paper substrate. A pressure of several hundred pounds per square inch on pressure rolls should be used while the material is maintained at an elevated temperature as is conventional for the production of polyolefin-paper laminates.

FIGURE 5 shows a perspective view of the end of a bottle which is blow-molded in the same manner as the bottle of FIGURE 3. The bottom pinched seam 10 is seen at the center of the indented configuration 12 which consists of a first indented continuous surface 14 and a bottom wall 16. The pinching off of such indented configuration bottom seams on blow-molded products strains the heated material. If the mass is not exceptionally cohesive to itself, this bottom seam 10 will not be adequately formed and will allow breakage upon dropping onto a hard surface. It has been found that in blow-molding such indented configuration bottles from the present material, a seam may be formed which is comparable in strength and impact tests to conventionally formed bottom seams which are formed on the plane of the lowermost surface of the bottle end.

The kneaded mixture is composed of three polymer components. The first component is a polyolefin material, the second is a water-insoluble polyamide resin, and the third component is a metal ion-containing polymer which is believed to act as a compatibilizer for the first two components which are normally incompatible in low pressure extrudates, but have been previously made partially compatible to allow commercial success by the employment of high pressure kneadings as mentioned above.

The polyolefin component is present in an amount of from 40 to 90 parts by weight of the total blended polymer mixture. While polyethylene and polypropylene or poly (propylene:ethylene) copolymers are the preferred polyolefin resins, other members of this group of similar molecular weight distributions are useable. When ASTM Type I regular branched, low density (approximately 0.92–0.93) polyethylene is employed, it has been found preferable to maintain the presence of such component within from 45 to 75 parts by weight. When employing Type III, linear polyethylene of approximately 0.95 density, the preferred range of the parts by weight is from 75 to 90. When employing polypropylene type resins, a preferred range is from 70 to 90 parts by weight of the total blended polymer system.

Suitable polyolefins are: regular branched, low density (0.92–0.93) polyethylene tradenamed "Bakelite DYNK–1" by the Union Carbide Plastics Company, high density (0.95) polyethylene under "Marlex 5012" tradename by Phillips Chemical Company, and an isotactic-type polypropylene resin containing a minor amount of copolymerized ethylene having a density of 0.91 and a melt index of 0.55 at 230° C. A suitable polypropylene is marketed as TC–6–12 by Shell Chemical Company.

The water-insoluble polyamide resin which is the second component of the polymer blend is present in an amount of from 5 to 50 parts by weight of the total polymer blend. The proportion of the polyamide component is generally controlled by the desired amount of the polyolefin component and the metal ion-containing polymer, the third component. That is, the amounts of the other two components are first chosen and then an amount of nylon within the above range is added. Various types of nylons may be employed. Nylon materials resulting from the polymerization of caprolactams or from the condensation of a dibasic organic acid and a diamine may be utilized for the second polymer component. When the caprolactam polymerization process is used, care must be exercised that the concentration of the unreacted monomer caprolactam in the polycaprolactam component is maintained at a low level. A preferred polyamide material of this type is the polymer formed by the polymerization of epsilon-amino-caprolactam known as poly-epsilon-caprolactam or, commercially, as Nylon 6. A suitable commercial variety is Spencer Nylon 600, which has a melt index of 8.0 at 490° F. (255° C.).

When the condensation process is employed, the dibasic acid may be any of the several employed for such polyamide materials. Generally, these are adipic or sebacic acids which furnish, respectively, six and ten carbon atoms between recurring nitrogen atoms in the polymer chain. The diamine monomer for the production of the polyamide polymer contributes generally 5 or 6 atoms between recurring nitrogen atoms, and hence, is usually pentamethylenediamine or hexamethylenediamine. When adipic acid and hexamethylenediamine are condensed together, the product is known as Nylon 6,6, whereas when sebacic acid is employed, the product is known as Nylon 6,10. Therewith, the following nylon types are useful for the second component of the polymer blend of the present invention: Nylon 6, 6–6, 6–10, and 5–10.

The term water-insoluble polyamide resin having recurring amide groups as integral parts of the polymer chain defines a polymeric carbonamide which has recurring carbonamide groups in the chain separated by at least two carbon atoms.

The metal ion-containing polymer of the resin blend of the instant invention is present in an amount of from 2 to 25 parts by weight and is characterized generally by containing at least 50 mole percent ethylene based on the copolymer and an $\alpha,\beta$-ethylenically unsaturated monocarboxylic acid, the acid monomer content of said copolymer being from 0.2 to 25 mole percent based on the copolymer, such as acrylic acid or methacrylic acid, said copolymer having at least 10 percent of the carboxylic acid groups thereof neutralized by sodium ions. Illustrative examples of $\alpha,\beta$-ethylenically unsaturated monocarboxylic acids which may be copolymerized with ethylene include acrylic acid, methacrylic acid and the like. The ethylene and the $\alpha,\beta$-ethylenically unsaturated acid monomer are copolymerized by a free radical catalyst as is conventional. The polymer is then precipitated from the polymerization medium and washed. Thereafter, the metal ion is added to the copolymer in the form of a metal salt, such as a formate, a methoxide, an ethoxide, a nitrate, carbonate, bicarbonate, acetate or hydroxide of sufficient solubility. The mixture of the copolymer and the metal salt is then heated to neutralize a portion of the carboxylic groups which are pendant to the main polymer chain backbone. The heating then volatilizes the hydrogen-salt radical reaction product from the molten mass. The compatibilizing metal ion-containing polymer may conveniently be made by following the procedures of Canadian Patent No. 674,595, issued Nov. 19, 1963. When manufactured, it exhibits ionic attraction when in the solid state at room temperatures. Upon heating to elevated temperatures, the molten material attains an energy state at which imposed mechanical sheer stresses break and disrupt the ionic crosslinks so that the polymer material exhibits a melt flow index close to that of a polymer formed from the monomer used for the major portion of the polymer backbone chain. Here, the melt-flow characteristics are close to those for polyethylene. Thus, the compatibilizing metal ion-containing polymer is compatible during extrusion and molding with the polyethylene component of the polymer blend. On cooling, however, the compatibilizing resin, when used alone, reverts to the ionic crosslinking present in the solid state and the ionic bonds are reformed and the solidified copolymer then exhibits the properties of a crosslinked material rather than of a purely thermoplastic material, as is the case with the polyolefin component of the resin blend.

In the following examples of practice, parts are expressed by weight, unless otherwise specified.

EXAMPLE I

Polymer blend components: Parts by weight
   (1) Type I polyethylene _____ 40
   (2) Nylon 6 _____ 50
   (3) Metal ion-containing polymer [1] _____ 10

[1] A copolymer of ethylene and methacrylic acid containing 96 molar percent ethylene and 4 molar percent methacrylic acid, the methacrylic acid being neutralized about 38% by sodium ions.

The above proportions of the components in the form of solid pellets were mixed and placed in the hopper of a laboratory extruder having a metering-type screw and a gate valve installed between the discharge end of the extruder barrel and the rod-forming die. The laboratory extruder was then operated at 2000 p.s.i. The metering-type screw had a length to diameter ratio of 14:1 and was employed to mix and knead the molten mass by affecting turbulence and interkneading of the polymer components with concomitant high shearing action. The molten mass was then extruded to the end of the extruder barrel, past the gate valve, and into a solid rod of extrudate. The pressure on the upstream side of the gate vale was 2000 p.s.i. and the kneading temperature was 445° F. The solid rod of extrudate was then cooled to room temperature, granulated and dried. The ground mixture was then re-extruded through the same extruder, the round die having been replaced by an annular die and a four-ounce cylinder bottle blow molding die attached to the end of the extruder barrel. The same temperature and pressure conditions were employed as in the original kneading operation and a number of bottles were molded from the blended polymer made up. The originally extruded rod or parison and the bottle walls of the molded bottles were observed to be smooth and of a greater translucency.

A suitable polyethylene is "Bakelite DYNK–1," manufactured by Union Carbide Plastics Company, while a suitable nylon is Spencer's "Nylon 600."

The molded bottles were filled with water, capped, and dropped from various heights to determine the impact resistance, particularly of the bottom pinch seams. Of 10 bottles so tested, none of the bottles broke when dropped from heights of 3, 4 and 5 feet. One of the bottles broke at 6 and 7 foot drops each, and 4 of the bottles broke at a 9 foot drop, and one bottle broke at a 10 foot drop. Three of the bottles successfully passed a 10 foot drop test which is, of course, greater than commercially necessary. The bottles were dropped from continuing heights until breakage of all occurred, giving an average failure height of over 11.8 feet.

A second group of the bottles were tested for organic liquid permeability. The bottles were filled with n-heptane and capped and then subjected to an oven treatment of an elevated temperature of 120° F. for 29 days. The loss in weight was recalculated to a yearly weight loss basis. Upon averaging the loss of content from the group of bottles tested, the average loss per year was 0.060%. The individual samples run ranged in loss from 0.0003% to 0.116% loss per year. A control run was made at the same time under similar conditions with bottles manufactured from a high pressure kneaded material consisting only of nylon and polyethylene, in 50:50 proportions. The average loss of the control samples run was 0.188% per year, while the range of loss was from 0.039% to 0.338%. Thus, the average loss per year of the material having no metal ion-containing polymer therein is three times that of the materials of the present invention, illustrating that the use of the compatibilizer polymer increases the impermeability of the composition to fluids.

Similar drop tests from varying heights on the material made from only polyethylene and nylon resulted in 2 of the 10 bottles breaking at a drop of 3 feet, 6 at a height of 4 feet, and the remaining 2 at a height of 5 feet. Thus, the present material substantially increases the impact resistance of blow molded bottles over those of the prior art.

The bottles manufactured in the present example were considered to be of poor quality due to variations in the wall thickness, but not withstanding the variation in wall thickness, they show uniformly superior permeability and impact resistance strength. Additionally, the novel material of the present invention did not show permanent creasing upon deformation by mechanical force and had immediate deformation recovery without pinch-crazing. This last test is qualitatively determined by imposing a deformation force upon a thin section, such as the side wall of a blown bottle, which is sufficient to bend the material over approximately 180°. If, after returning to the original configuration, the section shows a definite white line at the creased line, the material has internally delaminated and has become microscopically separated. The material of the present invention, while able to form thinner sidewalls in blown objects, does not show the susceptibility to pinch-crazing which is exhibited by the materials of the prior art.

EXAMPLE II

Polymer blend components: Parts by weight
   (1) Type I polyethylene _____ 45
   (2) Nylon 6 _____ 50
   (3) Metal ion-containing polymer [1] _____ 5

[1] A copolymer of ethylene and methacrylic acid containing 96 molar percent ethylene and 4 molar percent methacrylic acid, the methacrylic acid being neutralized about 38% by sodium ions.

Pellets mixed in the proportions shown were placed into the hopper of a metering-type screw extruded of the type described in Example I. The extruder was operated at a pressure of 1950 p.s.i. and a temperature of 448° F. Upon re-extrusion and blow-molding into 4 ounce bottles, the same impact strength and heptane permeability tests were carried out as above. The drop test data was that 4 of the 10 bottles tested broke at 9 feet whereas 6 of the bottles broke at a 10 foot drop. Therewith, the average failure height was 9.6 feet. Upon testing for permeation of n-heptane, the average loss per year was 0.012% whereas the range of losses over the bottles tested was from a small net gain (due to experimental error) to 0.024% weight loss per year.

As this particular composition showed favorable rheology and very low organic material loss or permeation and, of course, an impermeability to aqueous substances, it was used on a commercial type blow molding apparatus according to the following example.

EXAMPLE III

The ground extrudate of the initial pressure kneading operation of Example II was utilized to produce bottles on a Blow-O-Matic extruder and bottle blowing apparatus. The extruder was run at low speed in order to attain longer times during the pinch-off in the blowing cycle to improve the bottom pinch seam strength. The bottles were 4 ounce and of the so-called "Boston Round" shape and were made by the conventional process in which the blow molding apparatus operates by gripping and closing the end of an extruded tube, the gripping being at a distance from the end corresponding to the desired bottle height, surrounding the tube section by a mold which determines its shape, and blowing gas into the gripped and otherwise closed mouth end of the bottle so that the sidewalls are expanded into conformity with the mold. Thus, at the longer blowing cycle, the parison is forced together by the gripping action for a longer time to effect welding of the pinched ends of the tubing together. The melting temperature in the extruder nozzle was 420° F. and the pressure at the gate was 850 to 900 p.s.i. The extrudate tubing was approximately 0.10 inch in thickness and the molding die was 0.5 inch in diameter with a core of 0.350 inch diameter.

The complete cycle for molding a single bottle was approximately 23–25 seconds. The bottles were smoother both inside and outside than the previously employed polyethylene and nylon pressure kneaded mixtures and appeared to be more comparable to straight polyethylene than to the prior employed high pressure kneaded mixtures. The impact resistance of these bottles was somewhat lower than for those produced by Example II, but was superior to the prior kneaded materials.

This composition of 45 parts polyethylene, 50 parts Nylon 6, and 5 parts of the metal ion-containing polymer, consisting of a copolymer of ethylene and methacrylic acid containing 96 molar percent ethylene and 4 molar percent methacrylic acid, the methacrylic acid being neutralized about 38% by sodium ions.

EXAMPLE IV

In order to further test the novel material for degradation upon re-grinding and re-processing, a series of four runs were made and bottles blown with a Blow-O-Matic apparatus. The first set of bottles was made according to the previous description in Example III wherein the bottles were extruded from a pre-blended mixture of the components. The second set of bottles was made by re-grinding a portion of the extrudate of the original kneading process so that two processing steps were effected. A third set of bottles was manufactured by re-grinding a second portion of the original extrudate twice while a fourth set was made from a third re-grinding by kneading of the original extrudate. The bottles showed very similar average failure heights. The original process bottles had an average failure height of 6 feet, the first re-grind bottles, 6 feet, the second re-grind bottles, 6 feet, and the third re-grind bottles, 5.6 feet. These drop tests indicate that reprocessing of this composition does not seriously degrade the physical properties of the composition. Similar reprocessing of the material without the metal ion-containing polymer results in degradation of physical properties.

The bottles manufactured from the present material show only gradual discoloration upon re-grinding and very little lessening of failure height. The other favorable properties such as resistance to pinch-crazing, immediate recovery from imposed mechanical force, fluid permeation resistance, high impact strength, favorable rheological properties, internal cohesiveness even after heat treatment at several hundred degrees centigrade, good abrasion resistance, ability to form high-strength pinch seams even in indented bottoms, compatibility to inks and coloring matter and chemical inertness, are all preserved even after several extrusions and grindings.

EXAMPLE V

Polymer blend components: Parts by weight
   (1) Type I polyethylene _____ 47.5
   (2) Nylon 6 _____ 50
   (3) Metal ion-containing polymer [1] _____ 2.5

[1] A copolymer consisting of a copolymer of ethylene and methacrylic acid containing 96 molar percent ethylene and 4 molar percent methacrylic acid, the methacrylic acid being neutralized about 38% by sodium ions.

In order to determine the effect of a low content of the metal ion-containing polymer, pellets in the weight proportions above set out were kneaded and intermixed through a laboratory extruder having a 14:1 screw ratio with a metering type screw. The operating temperature was 450° F. and the pressure was 1850 p.s.i. From this first kneading operation, the extruded molten mass was blown into 4 ounce cylinder bottles. The wall smoothness of these bottles was strikingly improved over bottles of similar component proportions, but within the compatibilizing resin present. A check of the parison or extruded cylinder form also showed an unexpected surface smoothness and integrity upon both microscopic and macroscopic examination.

Filled bottle drop tests were carried out on 10 of these bottles in the same manner as in the above examples. The average failure height was 7.9 feet, 3 rupturing at 7 feet, 5 at 8 feet and 2 at 9 feet.

Comparison tests run on a 50:50 kneaded resin blend of the same polyethylene and nylon processed at 445° F. and 1700 p.s.i. resulted in an average failure height of 4 feet. None of the bottles survived a 5-foot drop.

The fluid impermeability properties were similar to those for the bottles made by the runs of the previous examples. A metal ion-containing polymer content of 2% by weight is sufficient to attain the improved rheological and morphological properties and to retain the desirable fluid impermeability properties.

EXAMPLE VI

Polymer blend components: Parts by weight
- (1) Type III polyethylene _____ 80
- (2) Nylon 6 _____ 15
- (3) Metal ion-containing polymer [1] _____ 5

[1] A copolymer of ethylene and methacrylic acid containing 96 molar percent ethylene and 4 molar percent methacrylic acid, the methacrylic acid being neutralized about 38% by sodium ions.

This run on a laboratory extruder was made to determine the effect of the employment of a high density polyethylene in the kneaded polymer. The polyethylene employed had a density of 0.950 gm./cc. and a melt index of 1.2. A suitable polyethylene with these characteristics is Marlex 5012, manufactured by Phillips Chemical Company.

The polymer pellets of the above proportions were mechanically mixed and processed according to the procedure of Example I above, at blowing cycle times of 14 seconds and 21 seconds. Upon the examination of the molded bottles, smooth surfaces and strong bottom pinch seams were found, indicating that the high density polyethylene was made compatible with the nylon.

The bottles molded with a 14 second blowing cycle in which the mold halves were held closed for a relatively short period had an average failure height of 10 feet. The bottles blown at the experimentally longer cycle time of 21 seconds exhibited a lower average failure height of 5.3 feet, indicating that long-residence times in the mold may be detrimental to some properties of the kneaded polymer. Of course, from a commercial standpoint, the shortest blowing cycle time is preferred.

Photomicrographic studies made at 100× magnification, using transmitted, cross-polarized light, revealed a smooth and uniform dispersion of the polymer components. This uniform dispersion of the polymer components is believed due to the compatibilizing effect of the metal ion-containing polymer.

EXAMPLE VII

Polymer blend components: Parts by weight
- (1) Type III polyethylene _____ 90
- (2) Nylon 6 _____ 10
- (3) Metal ion-containing polymer [1] _____ 1

[1] A copolymer of ethylene and methacrylic acid containing 96 molar percent ethylene and 4 molar percent methacrylic acid, the methacrylic acid being neutralized about 38% by sodium ions.

Pellets of each of the three components were measured out in the above proportions, mixed, and then directly extruded and blown into bottles. That is, there was no intermediate blending followed by a pelletizing step in this test. The extrusion conditions were similar to those in Example V, above, and the bottle walls showed that the resulting kneaded composition was much more uniform than in the absence of the small percentage of the metal ion-containing polymer.

Upon re-grinding this composition and blowing into bottles, some phase separation and lowering of the impact strength of the bottles was noticed.

The density of the polyethylene employed was 0.96 in this test.

Due to the phase separation upon re-grinding and the lower degree of uniformity upon the first extrusion, the composition was thought to be below commercially acceptable standards. Therefore, a second test was run with a slightly higher concentration of the third component.

EXAMPLE VIII

Polymer blend components: Parts by weight
- (1) Type III polyethylene _____ 90
- (2) Nylon 6 _____ 10
- (3) Metal ion-containing polymer [1] _____ 2

[1] A copolymer of ethylene and methacrylic acid containing 96 molar percent ethylene and 4 molar percent methacrylic acid, the methacrylic acid being neutralized about 38% by sodium ions.

This test follows Example VII in mixing, extrusion and blowing procedures. It was found that the composition upon first extrusion and blowing rendered a uniform resin system which had all of the desirable characteristics of the novel composition of the present invention. Upon re-grinding and a second blowing of bottles, no phase separation or lowering of the impact strength was noted. Therefore, this composition, as shown by the above proportions of components, is considered to embody the lowest commercially feasible concentration of the metal ion-containing polymer.

EXAMPLE IX

A series of two bottle molding runs was carried out using a copolymer of propylene and ethylene containing a major proportion of the former, rather than polyethylene. The bottles were molded according to the procedure of Example I above and evaluated microscopically by photomicrographic techniques, drop tests at room temperature and at 2° C. and by fluid permeability tests.

The component polymer and the average failure heights for the 4 ounce cylinder bottles are set out in Table 1 below.

TABLE 1

| Run | Parts by Weight | | | Average Failure Height | |
|---|---|---|---|---|---|
| | Polypropylene: ethylene copolymer | Nylon 6 | Metal Ion* Polymer | Room Temp. | 2° C. |
| 1 | 80 | 15 | 5 | 4.3 | 2.2 |
| 2 | 45 | 50 | 5 | 3.3 | 3.0 |

*A copolymer of ethylene and methacrylic acid containing 96 molar percent ethylene and 4 molar percent methacrylic acid, the methacrylic acid being neutralized about 38K by sodium ions.

The relatively lower failure heights may be partially explained by the photomicrographic observation that Run 1 was found to be of larger grain size than the corresponding polyethylene composition of Example VI. Apparently, this larger grain size allows separation of the bottom pinch seam at lower deformation forces. This observation was also found when comparing the photomicrographs of the Run 2 bottle side walls with those of Example II of similar component proportions. An identical pattern was observed but with slightly larger grain size.

The larger grain size observed under 100× magnification did not appear to effect the resistance to fluid permeation or to pinch-crazing. The polypropylene copolymer containing polymer blends are slightly stiffer than the polyethylene containing materials and, hence, are preferred for certain employments.

The extrudability is similar as is the good internal cohesion. Both the polypropylene based material and those of the prior examples are compatible with dyes, pigments and surface decoration ink materials.

A suitable polypropylene copolymer is TC-6-12 manufactured by Shell Chemical Company. This polymer is produced by copolymerizing a high portion of propylene with a low proportion of ethylene.

EXAMPLE X

In order to show the improvement in the impact resistance strength of bottles blown from the material of the present invention over bottles blown from the previous fluid impermeable composition containing a chemically inert but physically active inorganic powder, a series of drop tests were run. Four ounce straight cylinder bottles of the material of the present invention were tested against four ounce Boston Round bottles of the inorganic powder containing material. The test was carried out by filling each of the bottles with water at room temperature, capping the same and then dropping them on a hard, unyielding surface from a height of four feet for 50 drops each or until the bottles were broken.

The difference in the shape of the bottles tested would tend to make the bottles formed from the inorganic powder containing polymer system to appear to be more impact resistant than those of the straight cylinder configuration, formed from the material of the present invention. However, the material of the present invention is sufficiently uniform and internally compatible so that this difference in shape does not obscure their higher impact resistance strength, as shown by the data set out in Table 2.

The four ounce straight cylinder bottles were made according to Example II above. The four ounce Boston Round bottles for comparison were made by compounding a preliminary mixture of ASTM Type III polyethylene (specific gravity, 0.95 and melt index, 0.5) with colloidal silica powder until homogeneous. The mass was then sheeted out on a rubber mill, cooled and granulated. The ratio by weight of this preliminary mixture was 1 part of silica to 4 parts polyethylene. The granules were then tumbled with Type 6 nylon pellets (density 1.14 and melt index at 225° C. of 8.0). With the addition of polyethylene pellets, the final composition was controlled to be 1 part silica, 84 parts polyethylene and 15 parts nylon. This mixture was then fed into an extruder equipped with a 20:1 length, diameter, metering screw, and with a gating valve inserted in the nozzle. The Boston Round shaped bottles were blown from the molten tubing extrudate by the normal process.

The two runs of bottles so manufactured were then filled with cold tap water, screw-capped, and dropped from the height above set out at room temperature. The results of these impact tests are set out in Table 2.

The data set out was collected by dropping 10 bottles of each type from a height of four feet for a total of 50 drops each. From the empty weight, in grams, of each of the bottles, it can be seen that the Boston Round comparison bottles tend to be somewhat heavier and, therefore, to have a somewhat higher impact strength than if the weight, and hence, the thickness of the bottle walls were carefully controlled to be the same. That is, the heavier weight of the Boston Round bottles favors a higher impact resistance strength for those bottles. The average weight of the comparison Boston Round bottles is 14.6 grams whereas the average weight of the metal ion-containing polymer bottles (straight cylinder bottles) is 13.0 grams. The number of drops necessary to break each of the numbered bottles is recorded up to the limit of the test, 50 drops. Several of the bottles in each group had not broken after the total number of drops. The type of failure is recorded in the last column, and therewith, it can be seen that the prior art type Boston Round bottles broke in the sidewalls and at the bottom rim, whereas the bottles manufactured from the novel material of the present invention broken at the pinch-off seam rather than at the sidewall or the bottom rim.

TABLE 2.—INORGANIC REINFORCING FILLER BOTTLES (BOSTON ROUND)

| Bottle Number | Empty Weight (gm.) | No. Drops to Failure | Type of Failure* |
|---|---|---|---|
| 1 | 15.8 | 2 | SW+BR |
| 2 | 14.8 | 2 | SW+BR |
| 3 | 15.8 | +50 | |
| 4 | 14.4 | 3 | SW+BR |
| 5 | 15.6 | 1 | SW+BR |
| 6 | 11.3 | 4 | SW |
| 7 | 15.6 | +50 | |
| 8 | 15.4 | 1 | SW |
| 9 | 11.7 | 1 | SW |
| 10 | 15.3 | 19 | SW |

METAL ION CONTAINING POLYMER BOTTLES (STRAIGHT CYLINDER)

| | | | |
|---|---|---|---|
| 1 | 13.3 | 46 | PO |
| 2 | 12.2 | +50 | |
| 3 | 13.1 | 45 | PO |
| 4 | 13.8 | 41 | PO |
| 5 | 12.4 | 17 | PO |
| 6 | 12.8 | +50 | |
| 7 | 14.2 | 39 | PO |
| 8 | 11.9 | +50 | |
| 9 | 11.5 | 26 | PO |
| 10 | 14.4 | 26 | PO |

*SW—Side Wall Failure; BR—Bottom Rim Failure; PO—Pinch Off Failure.

From the above data, it can be seen that three of the Boston Round comparison bottles broke in a single drop (Nos. 5, 8 and 9). By comparison, the weakest bottle of the new material required 17 drops before failure of the pinch-off seam occurred. While 7 of the comparison Boston Round bottles failed in less than 5 drops, the same number of the straight cylinder bottles all failed within 46 drops. For those bottles which failed during the test, the highest number of drops sustained for the prior art material was 19, whereas the highest number of drops sustained by the new material was 46. Therewith, of the bottles which failed during the tests, the average number of drops to failure for the prior art material was 4 and the average number of drops to failure for the new material was 34.

While several bottles from each group remained after completion of the tests, the results clearly indicate that the new material may be blown into bottles of superior impact strength, with greatly enhanced commercialability of the novel material of the present invention.

Photomicrographs were prepared by extruding a rod of the prior polymer blend and a rod of a metal ion containing polymer blend and thereafter microtoming thin cross-sections for use in the microscope field. The prior art polymer blend extrudate was prepared by preblending a 50:50 polyethylene-nylon mixture at high pressures and elevated temperatures and then comminuting the same into pellets. These pellets were then extruded in a laboratory extruder at 455° F.

The polymer blend of the present invention was prepared by mechanically mixing 45 parts of medium density polyethylene, 45 parts of Nylon 6, and 9 parts of a sodium ion containing copolymer of 96 molar parts ethylene and 4 molar parts of methacrylic acid 38% neutralized with sodium ion. The blend was extruded at 455° F. in the same laboratory extruder as above.

Two inch sample pieces were cut from each of the extrudate rods. Two sections from each of the extrudates were photographed at 30× magnification using polarized light. The crystalline or grain structure of the metal ion containing polymer extrudate was fine, whereas that of the prior art type was rougher and showed that the incompatible polyethylene and nylon had not been rendered as completely compatible as when the metal ion-containing polymer was employed.

The two sections after being removed from the microscope were subjected, in turn, to heat treatment at 235° C. for 4 minutes. After cooling to room temperature, each of the same sections was placed under the microscope and photographs taken. The microphotograph of the metal ion containing extrudate had the same fine grain structure as before, indicating that the normally incompatible polymers have been rendered so completely homogeneous and physically or chemically compatible that the high temperature employed was not sufficient to cause these polymers to pull away from one another into agglomerated masses.

The microphotograph taken on the prior art material after the 235° C. heat treatment showed agglomeration and pulling apart of the two components into large grains consisting essentially of pure components. Of course, such agglomeration completely degrades the fluid impermeability and other useful properties of this material.

An ultimate degradation temperature, below thermal decomposition of the nylon component, has not been determined for the novel metal ion containing polymer of the present invention. For practical use, thermoplastic polymer products are not employed for temperatures exceeding the formation or molding temperatures so that this resin blend is heat stable over the highest range of temperatures in which its use is probable.

This unexpected heat stability allows the high pressure kneaded polymer blend to be used for many commercial and industrial uses where good flexibility, fluid impermeability and heat stability are necessary.

A useful method of kneading the polymer components is to first form a preblend of the polyolefin and polyamide resins, pelletize the extrudate and then mix with metal ion-containing polymer pelets and pressure knead the mass formed.

Films or sheets of the metal ion containing polymer of the present invention can be extruded through thin-lipped dies, cooled to room temperatures and employed as wrapping material which is flexible and resists taking a permanent crease upon bending, as well as presenting a transfer barrier to water and the various organic materials, such as solvents, fats, greases, etc. Such films or sheets when hot may be pressed onto paper or fiberboard barriers. Such coated or laminated materials can be wound into container bodies such as drums and cans, and provided with ends of like materials, or stamped and shaped into boxes and other containers, preferably with the film of the instant material at the inside.

In the claims, the word "film" is intended to refer to a supported or unsupported web, sheet or film of the novel material.

Various conventional equipment can be used to perform the interkneading of the polymer components. Laboratory extruders, open roll mills, Blow-O-Matic extruding and blow molding machines, Dulmage screw extruders, Banbury mills operated at ordinary pressures and temperatures may be employed. For full protection against oxidation, particularly with use of an open roll mill or a Banbury mill, an inert gas atmosphere may be used. Operating pressures in such extruders are generally from 400 to 5000 p.s.i. Most runs for interkneading have been performed in the 850 to 3500 p.s.i. range over which substantially identical results have been found. The higher pressures, of course, offer the advantage of higher commercial productions without detrimental side effects. For attaining a suitable volumetric flow rate for bottle blowing or other uses, the operating pressure in the extruders may be varied over a wide range, while effecting the necessary interkneading. That is, even at operating pressures lower than those above set out, the mixing will be sufficient to cause the three polymer components to interact to form the novel composition. Therewith, blending of polyethylene and the metal ion containing polymer on an open roll mill, followed by addition of the nylon component, has been found successful, whereas polyethylene and the nylon would not blend alone. Therefore, no minimum pressure appears to be necessary with the use of laboratory or commercial equipment.

The elevated temperature employed during mixing or kneading is generally close to the melting point of the polyolefin component. While not limiting the invention to any particular theory of operation, a probable action is that the polyolefin attains a plastic state sufficient for it to blend with the metal ion containing polymer after which the blended mixture then accepts the polyamide component to allow the uniform, stable product.

An important advantage of the novel material manufactured according to the present disclosure is that containers and films with thin cross-sectional areas may be produced, which have all of the above-mentioned advantages and properties. The prior art material cannot be molded or die extruded with constant success at thicknesses much less than 20 mils, whereas the present material may be reproducibly formed over extended areas in thicknesses of about 10 mils. For commercial employment, this is an important property.

The like components of the specific examples of practice may be interchanged for one another according to the above teachings.

It is obvious that the illustrative practices are not restrictive and that the invention can be practiced in many ways within the scope of the appended claimed subject matter.

What is claimed is:

1. A composition of matter comprising 40 to 90 parts by weight of a polyolefin resin, 5 to 50 parts by weight of a water-insoluble polyamide resin having recurring amide groups as integral parts of the polymer chain and 2 to 25 parts by weight of a metal ion containing copolymer comprised of at least 50 mole percent ethylene based on the copolymer and an $\alpha,\beta$-ethylenically unsaturated monocarboxylic acid, the acid monomer content of the said copolymer being from 0.2 to 25 mole percent, based on the copolymer, said copolymer having at least 10 percent of the carboxylic acid groups thereof neutralized by sodium ions.

2. The composition of claim 1 wherein the polyolefin resin is selected from the class consisting of polyethylene and polypropylene, their copolymers and mixtures thereof.

3. The composition of claim 1 wherein the polyamide resin is selected from the class consisting of polyhexamethylene sebacamide, and polyhexamethylene adipamide and poly-epsilon-caprolactam.

4. The composition of claim 1 wherein the $\alpha,\beta$-ethylenically unsaturated monocarboxylic acid is methacrylic acid.

5. The composition of claim 1 wherein the ionic copolymer is a copolymer of approximately 96 molar parts ethylene and approximately 4 molar parts methacrylic acid, said copolymer having about 38 percent of the carboxylic groups neutralized by sodium ions.

6. A filament prepared from the composition of claim 1.

7. A bottle resistant to permeation by fluids and pinch-crazing having body portions thereof made from the composition of claim 1.

8. A film resistant to permeation by fluids and pinch-crazing prepared from the composition of claim 1.

References Cited

UNITED STATES PATENTS 3,093,255 6/1963 Mesrobian _____ 260—857
3,274,289 9/1966 Murdock _____ 260—857

MURRAY TILLMAN, *Primary Examiner.*

P. LIEBERMAN, *Assistant Examiner.*